Feb. 26, 1952  C. M. LOPEZ  2,587,053
JOINT CONSTRUCTION FOR ENDLESS BELTS
Filed Oct. 21, 1948

INVENTOR
CHARLES M. LOPEZ
BY
*Knight & Rodgers*
ATTORNEYS

Patented Feb. 26, 1952

2,587,053

UNITED STATES PATENT OFFICE 2,587,053

JOINT CONSTRUCTION FOR ENDLESS BELTS

Charles M. Lopez, Los Angeles, Calif.

Application October 21, 1948, Serial No. 55,698

2 Claims. (Cl. 24—33)

This invention relates to belt lacing and more particularly to the lacing of wide belts which tend to stretch longitudinally and to shrink transversely in use.

In many types of mechanisms wide belts are used for conveying articles and for transmitting motion. It is common practice to join the ends of such belts by lacing them together with a plurality of small staple-like lacing clips, their ends being hooked through an end portion of the belt. These clips are mounted on the belt ends so that bent central portions thereof will project endwise from the end of the belt in the form of small loops. These endwise looped projections from the two ends of the belt are then placed in overlapping aligned relation and a hinge wire is inserted through the aligned looped extensions hingedly to connect the belt ends to each other. This provides an excellent belt lacing for most belts, but since wide belts are sometimes difficult to true up on the pulleys or rollers over which they run, guide elements, such as rollers, usually are provided along the edges of such belts. Since the hinge wire extends transversely across the belt, when the belt is stretched lengthwise during use, and its transverse dimension is thereby reduced, the hinge wire, retaining its original length, tends to project laterally beyond the edges of the belt. When the ends of the hinge wire project beyond the edges of the belt they strike the guide means and damage the guide means or the belt itself. It is common practice, in order to prevent the lacing hinge wire from so projecting beyond the edges of the belt, to make the lacing shorter than the original width of the belt by terminating the lacing an inch or so inwardly from each edge of the belt. Such an arrangement does prevent the lacing hinge wire from projecting beyond the edges of the contracted belt, since initially the lacing is some inches shorter than the width of the belt. Nevertheless it still prevents the laced portion of the belt from conforming to changes in width of the remainder of the belt, and leaves the edges of the belt adjacent the ends of the lacing without support.

This failure of the laced portion to conform to lateral shrinkage of the remainder of the belt is of considerable importance in large ironing machines, for example, of the type used in laundries for the ironing of sheets and other flat work, since the work pieces are drawn out of shape by the non-conforming lacing area of the supporting conveyor belt. The tendency toward longitudinal stretching and lateral contraction of such belts is increased when they become moistened in use, as in the case of an ironing machine belt above-mentioned.

An object of the present invention is to make an improved belt lacing for use in lacing wide belts.

Another object is to make a belt lacing which is free to shrink and expand in conformity with changes in the width of the remainder of the belt.

In order to attain these objects, there is provided, in accordance with one feature of the invention, a belt lacing for a stretchable belt, particularly of canvas, wherein a plurality of laterally separated lacing loops are secured to each of the two ends of the belt to be joined together, to extend endwise from the ends of the belt upon which the lacing loops are mounted, and a pair of wire hinge pins are inserted from opposite edges of the belt through the lacing loops when aligned to bring the ends of the belt together. The hinge wires are of a length to bring their free inner ends into overlapping relation with each other, and the outer end of each hinge wire 15 secured adjacent the edge of the belt.

In the embodiment of the invention illustrated in the accompanying drawings, comprising one sheet:

Figure 1:
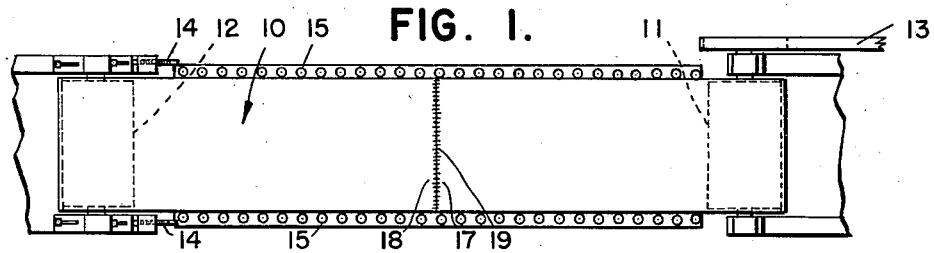
Fig. 1 is a plan view of a wide canvas belt mounted around a pair of rollers, portions of the roller supports being broken away.
Figure 2:
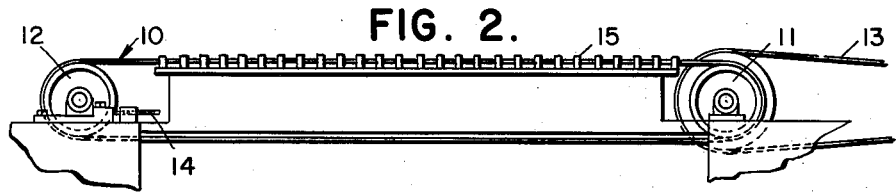
Fig. 2 is a side elevational view of the structure of Fig. 1.

In the illustrated form of the invention, a wide canvas belt 10 is mounted to run over a power driven head roller 11 and a tail roller 12. The head roller 11 is arranged to be driven through a usual drive belt 13 from a prime mover of a usual sort, not shown, such as an electric motor. The tail roller is adjustable by bolts 14 in a usual manner to take up slack and maintain the belt at a required degree of tautness.

A plurality of edge guides such as the rollers 15 are mounted to turn on vertical axes and engage the edges of the top run of the belt to guide it against lateral displacement.

Figure 3:
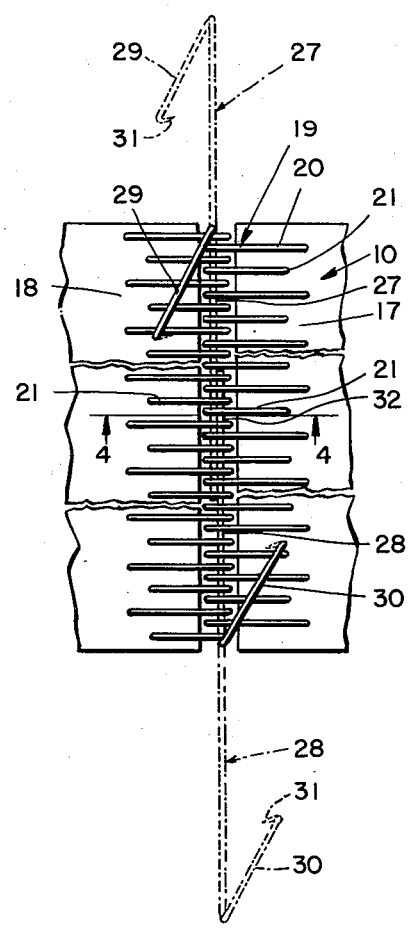
Fig. 3 is an enlarged fragmentary view of the laced portion of the belt shown in Fig. 1, intermediate portions being broken away to permit enlarging the scale of the drawing.
Figure 4:
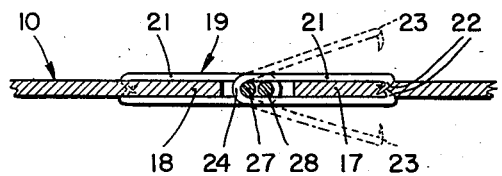
Fig. 4 is a sectional view on the line 4—4 of Fig. 3.

The ends 17 and 18 of the belt are joined together to form the belt into a closed loop by means of a hinge type of belt lacing 19. The lacing arrangement shown in detail in Figs. 3 and 4 comprises a plurality of small U-shaped clips 20 and 21. The clips 20 are somewhat longer than the clips 21 so as to distribute the stresses to which they are subjected over a larger area of the belt than would be the case if they were all of the same length. The lacing clips 20 and 21 are of a usual type with inwardly bent, hooked, pointed ends 22 on each of their legs. The clips initially are formed with their legs diverging as shown in dotted lines 23 in Fig. 4. They are assembled, when thus opened up, in a lacing tool of a well known type not shown. When an end of the belt 10 is inserted between the legs and the tool is actuated to bend the clips to the solid line position of Fig. 4, this action drives the hooked ends 22 of the clips through the belt to anchor the clips firmly to the belt. The bend or bight 24 of each clip, is spaced outwardly from the end of the belt as best shown in Fig. 4, to permit the insertion of a hinge or lacing wire therein.

However, in the present invention, instead of the usual through hinge wire, a pair of shorter hinge wires 27 and 28 are inserted through the lacing clips of the two ends of the belt 10. The clips 20 and 21 of the two ends of the belt are aligned and alternately interposed to receive the hinge wires as shown in Figs. 3 and 4. The two hinge wires 27 and 28 are bent reversely upon themselves at their outer ends as at 29 and 30 and their extreme end portions are secured to the belt fabrics as by small anchoring hooks 31 formed thereon, see Fig. 3. These hooks are forced into the belt fabric similarly to the hooks 22 on the lacing clips 20 and 21. The hinge wires 27 and 28 are each considerably shorter than the width of the belt 10, but are of a length to overlap each other at least for a slight distance as at 32, so that all of the lacing clips have at least one of the hinge wires passing therethrough. With this construction, any narrowing of the belt throughout its length will be free to continue through the laced area, since the hinge wires 27 and 28 are free to move relatively inwardly toward a position of lesser lateral spacing. Each clip therefore is a separate unit and is free to permit lateral expansion and contraction of the laced portion of the belt without interference.

This eliminates the usual "spreader bar" effect produced by the usual single through hinge wire which is merely bent over at its ends, and does not penetrate the belt material. The new arrangement also avoids the necessity of making the hinge shorter than the width of the belt and, as is done in some instances, turning in the corners of the belt where they project beyond the ends of the lacing. Thus the new construction, in addition to providing for the lacing to conform constantly to changing widths of the belt, tends also to increase belt life by providing full and uniform lacing support for the belt throughout its entire width.

While I have illustrated a preferred form of my invention, it will be apparent to those familiar with the art that the arrangement is capable of some change without departing from the spirit of the invention. It is desired therefore not to limit the invention except as set forth in the following claims.

I claim:

1. An expansible lacing for belts which tends to elongate and to be reduced in width during use, said lacing comprising an aligned row of separate lacing clips secured in laterally spaced relation to each end of such belt, said clips projecting endwise beyond the belt ends in the form of aligned loops, and a pair of hinge wires extending from opposite edges of the belt inwardly through aligned and overlapping rows of clips, the hinge wires each having substantially smooth surfaces and being of a length less than the width of the belt but having a total combined length greater than the width of the belt, the outer end of each wire being provided with means for securing the end in place and the inner ends of said wires being free and overlapping each other in freely sliding relationship.

2. A belt lacing to allow lateral contraction of a belt laced thereby, said lacing comprising a plurality of narrow individual clip members secured across one end of the belt to be laced in laterally spaced relation to free the belt end for lateral contraction, a similar plurality of clip members mounted in similarly spaced relation on the other end of said belt and adapted to be interposed between, in alignment with, and in laterally spaced relation to, the clips on said one belt end, said clips when thus aligned and interposed forming a channel adapted to receive a lacing hinge pin element, and a hinge pin element comprising a pair of wires inserted in said channel, an outer end of each wire extending substantially to the edge of the belt, and being bent laterally and inwardly upon itself to overlie an end portion of the belt and being secured thereto, the inner ends of said wires being in overlapped relation and each terminating short of the opposite edge of the belt from that to which it is secured.

CHARLES M. LOPEZ.

REFERENCES CITED

The following references are of record in the file of this patent:

UNITED STATES PATENTS

| Number | Name | Date |
|---|---|---|
| 84,772 | Shannon | Dec. 8, 1868 |
| 218,008 | Flanagan | July 29, 1879 |
| 249,828 | Flanagan | Nov. 22, 1881 |
| 767,473 | Conn | Aug. 16, 1904 |
| 915,905 | Thomas | Mar. 23, 1909 |
| 1,163,780 | Schneider | Dec. 14, 1915 |
| 1,454,460 | Moore | May 8, 1923 |
| 1,975,570 | Edgcumbe | Oct. 2, 1934 |

FOREIGN PATENTS

| Number | Country | Date |
|---|---|---|
| 353,003 | Germany | May 31, 1922 |